US007275835B2

(12) United States Patent
Kataoka

(10) Patent No.: US 7,275,835 B2
(45) Date of Patent: Oct. 2, 2007

(54) PROJECTOR FOR CHANGING DRIVING FREQUENCY FOR DRIVING LIGHT SOURCE LAMP WITHIN ALLOWABLE FREQUENCY RANGE

(75) Inventor: Toru Kataoka, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 32 days.

(21) Appl. No.: 11/212,744

(22) Filed: Aug. 29, 2005

(65) Prior Publication Data

US 2006/0049775 A1 Mar. 9, 2006

(30) Foreign Application Priority Data

Sep. 6, 2004 (JP) ............................ 2004-258231

(51) Int. Cl.
*G03B 21/20* (2006.01)

(52) U.S. Cl. ........................ 353/85; 348/744; 348/759; 315/291; 315/224; 315/307

(58) Field of Classification Search .................. 353/85, 353/30, 98, 49; 315/291, 224, 246, 307; 345/102; 348/744, 756, 751, 771, 759; 349/24, 349/25

See application file for complete search history.

(56) References Cited

U.S. PATENT DOCUMENTS 5,990,853 A * 11/1999 Kuratomi et al. ............. 345/48
7,071,931 B2 * 7/2006 Tegreene et al. ............ 345/207
7,138,769 B2 * 11/2006 Suzuki et al. ............... 315/289
2005/0179639 A1 * 8/2005 Hsieh ......................... 345/102

FOREIGN PATENT DOCUMENTS

| | | |
|---|---|---|
| JP | 7-325286 | 12/1995 |
| JP | 11-327516 | 11/1999 |
| JP | 2000-10069 | 1/2000 |
| JP | 2003-156798 | 5/2003 |
| JP | 2003-307721 | 10/2003 |

* cited by examiner

*Primary Examiner*—Haissa Philogene
(74) *Attorney, Agent, or Firm*—McGinn IP Law Group, PLLC

(57) ABSTRACT

A projector according to the present invention comprises a lamp driving control circuit for driving an ultra-high pressure mercury lamp at a driving frequency which is changed within an allowable frequency range. For example, the lamp driving control circuit may randomly select a frequency within the allowable frequency range, or modulate the highest frequency within the allowable frequency range such that the frequency is reduced, to change the driving frequency. Consequently, the driving frequency for a fixed pixel panel is not in synchronization with the driving frequency for the ultra-high pressure mercury lamp, and the driving frequency for the ultra-high pressure mercury lamp is changed within the allowable frequency range, causing variations in location at which flicker occurs during projection of an image. Such flicker is less perceivable to human's eyes due to the human's visual characteristics. As a result, the projector which comprises an AC-driven light source lamp can prevent flicker (light/dark noise) and prevent a reduction in the lifetime of the lamp even when the projector is applied with a variety of video signals which include vertical synchronizing signals at different frequencies.

20 Claims, 5 Drawing Sheets

PROJECTOR FOR CHANGING DRIVING FREQUENCY FOR DRIVING LIGHT SOURCE LAMP WITHIN ALLOWABLE FREQUENCY RANGE

BACKGROUND OF THE INVENTION

1. Field of the Invention

The present invention relates to a projector which employs an AC-driven ultra-high pressure mercury lamp as a light source lamp, and more particularly to a method of controlling the light source lamp for driving.

2. Description of the Related Art

FIG. 1 illustrates the configuration of a conventional projector which comprises an AC-driven light source lamp. As illustrated in FIG. 1, this conventional projector comprises RGB/video image processing circuit 10, scaler circuit 11, fixed pixel panel driving circuit 12, projection lens 13, fixed pixel panel 14 such as a transmission-type liquid crystal panel, a reflection-type liquid display panel, DMD (Digital Micromirror Device) or the like, projector main control circuit 45, AC-driven ultra-high pressure mercury lamp 19, lamp driving circuit 18 for driving ultra-high pressure mercury lamp 19, and lamp driving control circuit 47 for controlling ultra-high pressure mercury lamp 19 for driving through lamp driving circuit 18.

RGB/video image processing circuit 10 converts an analog video signal applied thereto to a digital video signal which is delivered therefrom. Scaler circuit 11 converts the resolution of the digital video signal from RGB/video processing circuit 10 to conform to the number of pixels on fixed pixel panel 14.

Fixed pixel panel driving circuit 12 drives fixed pixel panel 14 based on the video signal, the resolution of which has been converted by scaler circuit 11. Projection lens 13 includes a projection optical system for projecting transmitted light which has been transmitted by fixed pixel panel 14 onto screen 9.

Projector main control circuit 45 controls the overall projector. Projector main control circuit 45 in this conventional projector notifies lamp driving control circuit 47 of a driving frequency for fixed pixel panel 14.

In this conventional projector, fixed pixel panel 14 is driven based on a video signal applied thereto, and incident illumination light from ultra-high pressure mercury lamp 19, which serves as a light source lamp, is transmitted or reflected by fixed pixel panel 14 to project an image onto the screen.

Here, applied video signals may have vertical synchronizing signals at a variety of frequencies (hereinafter called the "vertical synchronizing frequency"). Specifically, the projector may be applied with video signals having a variety of vertical synchronizing frequencies, including video signals such as NTSC-, PAL-, SECAM-based video signals (vertical synchronizing frequency: 50/60 Hz), composite signals (525 i/p, 625 i/p, 720 i/p, 1080 i/p, vertical synchronizing frequencies: 25/30/4850/7-Hz) and the like, video signals from a personal computer (vertical synchronizing frequency: 50-120 Hz), and so forth.

Here, when the driving frequency for fixed pixel panel 14 is not synchronized to the driving frequency for ultra-high pressure mercury lamp 19, the driving frequencies interfere with each other to cause scrolling flicker (light, dark) to appear on projected image 9 displayed on the screen. To prevent such flicker, JP-A-2003-307721 has proposed a projector which sets a driving frequency for ultra-high pressure mercury lamp 19 in lamp driving control circuit 47 such that a driving frequency for fixed pixel panel 14 is in synchronization with the driving frequency for ultra-high pressure mercury lamp 19.

In the conventional projector disclosed in JP-A-2003-307721, the driving frequency for ultra-high pressure mercury lamp 18 is controlled to be an integer multiple of the driving frequency for fixed pixel panel 14 to establish the synchronization of the driving frequency for fixed pixel panel 14 with the driving frequency for ultra-high pressure mercury lamp 19.

For example, when a PAL video signal is applied to the projector to set the driving frequency for fixed pixel panel 14 to 50 (Hz), the driving frequency for ultra-high pressure mercury lamp 19 is set to 150 (Hz) or 200 (Hz) which is in synchronization with the driving frequency for fixed pixel panel 14. On the other hand, when an NTSC video signal is applied to the projector to set the driving frequency for fixed pixel panel 14 to 60 (Hz), the driving frequency for ultra-high pressure mercury lamp 19 is set to 180 (Hz) or 240 (Hz) which is in synchronization with the driving frequency for fixed pixel panel 14.

JP-A-2003-156798 in turn has proposed a projector which synchronizes the driving frequency for fixed pixel panel 14 with the driving frequency for ultra-high pressure mercury lamp 19 when the synchronization is possible, and sets a highest possible frequency at which scroll noise occurs due to the out-of-synchronization between the two driving frequencies. By thus increasing the frequency at which the scroll noise occurs, the resulting flicker does not seem flicker to human's eyes due to the human's visual characteristics.

For example, a description will be made of an exemplary situation in which the driving frequency for ultra-high pressure mercury lamp 19 is restricted within a range of 140-260 (Hz), and an applied video signal has a vertical synchronizing frequency of 87 Hz or higher. Also, assume that there is a condition that ultra-high pressure mercury lamp 19 is driven at 180 Hz or higher because a reduction in the driving frequency for ultra-high pressure mercury lamp 19 can result in flicker. Thus, when the driving frequency for fixed pixel panel 14 is set at 87 Hz, a frequency which is an integer multiple of 87 Hz cannot be set within the range of 180 to 260 Hz. To cope with this inconvenience, JP-A-2003-156798 discloses that in such a case, the driving frequency for ultra-high pressure mercury lamp 19 is set at 260 Hz which is the highest frequency within the restricted range to make the resulting flicker as inconspicuous as possible.

Next, FIG. 2 shows a lamp driving timing in the conventional projector. Here, since an applied video signal has a vertical synchronizing frequency of 60 Hz, and the driving frequency for fixed pixel panel 14 is at 60 Hz as well, lamp driving control circuit 17 sets the driving frequency for ultra-high pressure mercury lamp 19 at 180 (Hz). In this event, no scrolling flicker occurs because the driving frequency of 60 Hz for fixed pixel panel 14 is in synchronization with the driving frequency of 180 Hz for ultra-high pressure mercury lamp 19. However, even in this event, since the ultra-high pressure mercury lamp 19 is driven at a constant frequency, unscrolling flicker (light, dark) can occur when a video signal level is low, as represented by three vertical lines in FIG. 3.

While such unscrolling flicker is less conspicuous as compared with scrolling flicker, it can be pronounced as the case may be because it occurs at the same location. In addition, the unscrolling flicker can be perceived under bad conditions such as a low video signal level.

Also, the control for bringing the driving frequency for ultra-high pressure mercury lamp 19 into synchronization with the driving frequency for fixed pixel panel 14 involves following a change in the vertical synchronizing frequency of an applied video signal to change the driving frequency for ultra-high pressure mercury lamp 19. For this reason, if an applied video signal suffers from an instable vertical synchronizing frequency, the driving frequency for ultra-high pressure mercury lamp 19 follows the instability, resulting in failure in stably driving ultra-high pressure mercury lamp, judder of driving transformer, and a degraded reliability of the ultra-high pressure mercury lamp. Also, while the driving frequency for ultra-high pressure mercury lamp 19 can be set in a limited range, for example, from 140 to 260 (Hz) as described above, there is an optimal driving frequency at which the lifetime of ultra-high mercury lamp 19 can be made the longest. However, since the conventional projector changes the driving frequency based on the frequency of an applied video signal, the resulting driving frequency may not be optimal for the lamp. This can lead to a degraded reliability.

SUMMARY OF THE INVENTION

It is an object of the present invention to provide a projector employing a AC-driven light source lamp, which is capable of preventing flicker (light/dark noise) on a projection screen and a reduction in lifetime of the lamp even if it is applied with a variety of video signals which differ in the frequency of the vertical synchronizing signal.

The present invention is applied to a projector for driving a fixed pixel panel based on an applied video signal, and transmitting or reflecting illumination light from a light source lamp by the fixed pixel panel to project an image. The projector includes an AC-driven light source lamp, a lamp driving circuit for driving the light source lamp, and a lamp driving control circuit for controlling the light source lamp for driving through the lamp driving circuit by changing a driving frequency for driving the light source lamp within an allowable frequency range without reference to the applied video signal.

To achieve the above object, the projector according to the present invention is characterized in that the lamp driving control circuit changes the driving frequency for driving the light source lamp.

According to the present invention, the lamp driving control circuit does not drive the light source lamp at a constant driving frequency, but changes the driving frequency independently of the driving frequency for the fixed pixel panel. Thus, a change in the driving frequency for lighting the light source lamp causes a random change in location at which flicker appears on a projected image. Such flicker is not perceived to human's eyes as flicker due to the human's visual characteristics. Further, since the driving frequency for the light source lamp is set independently of the vertical synchronizing frequency of the applied video signal, the light source lamp can be driven with stability even if the applied video signal becomes instable.

The lamp driving control circuit may changes the driving frequency within the allowable frequency range, or without reference to the applied video signal.

The lamp driving control circuit may change the driving frequency by randomly selecting a frequency within the allowable frequency range, or by modulating the highest frequency within the allowable frequency range so as to reduce the frequency.

Another projector according to the present invention further includes a lamp load detecting circuit for detecting a loading condition of the light source lamp, wherein the lamp driving control circuit monitors the light source lamp for a loading condition detected by the lamp load detecting circuit to select a driving frequency at which the light source lamp is placed in an optimal condition, and modulates the selected driving frequency to change the driving frequency.

According to the present invention, the lamp driving control circuit selects a driving frequency which places the light source lamp in an optimal condition based on the loading condition of the light source lamp detected by the lamp load detecting circuit, independently of the frequency of the applied video signal, so that the lamp driving control circuit will never select a driving frequency which would exacerbate the reliability of the light source lamp, thus improving the reliability.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 4:
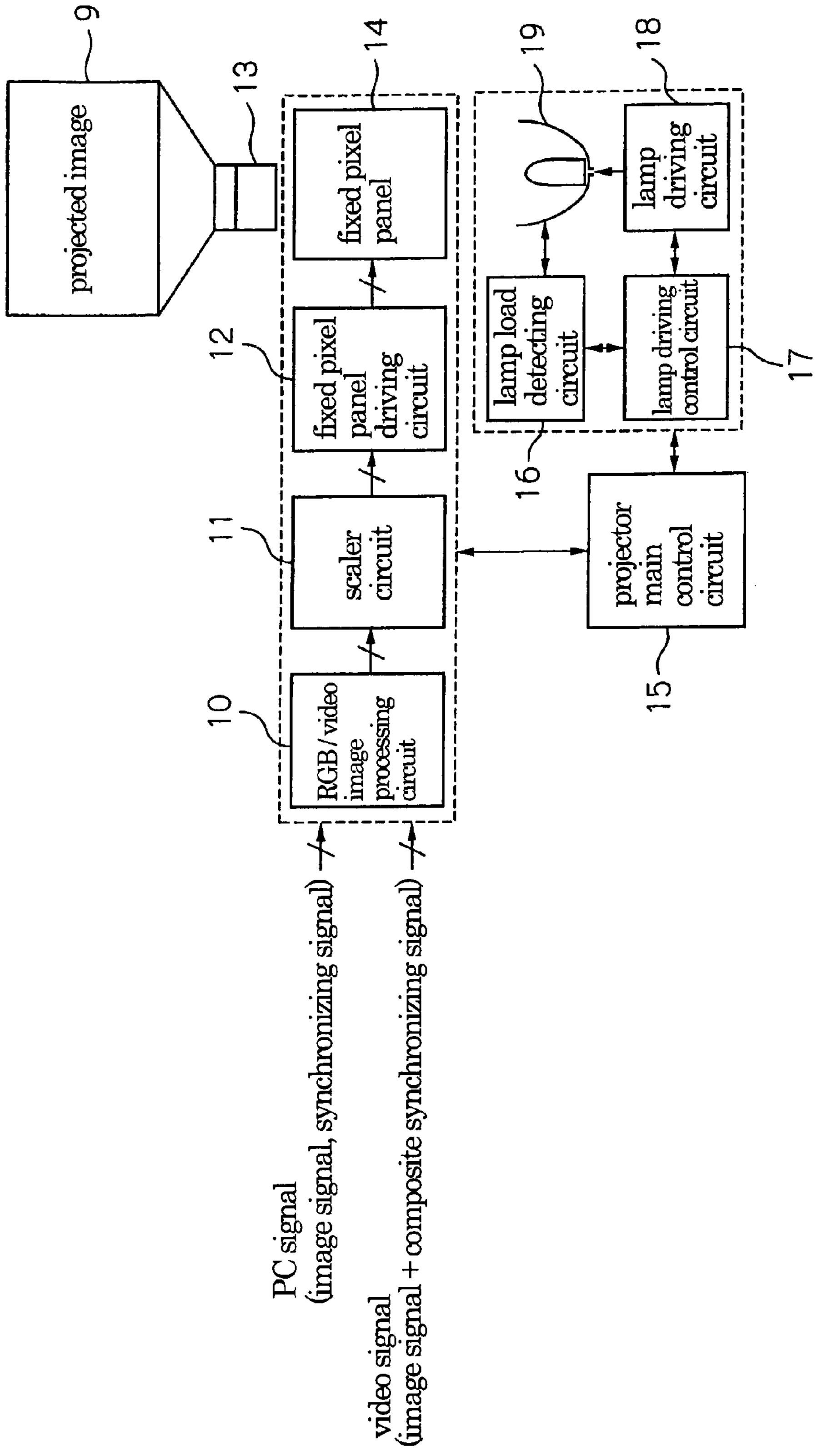
FIG. 4 is a block diagram illustrating the configuration of a projector according to one embodiment of the present invention.

FIG. 4 is a block diagram illustrating the configuration of a projector according to one embodiment of the present invention. In FIG. 4, the same components as those in FIG. 1 are designated the same reference numerals, and description thereon is omitted.

As illustrated in FIG. 4, the projector of this embodiment comprises RGB/video processing circuit 10, scaler circuit 11, fixed pixel panel driving circuit 12, projection lens 13, fixed pixel panel 14, projector main control circuit 15, lamp load detecting circuit 16, lamp driving control circuit 17, lamp driving circuit 18, and ultra-high pressure mercury lamp 19.

Figure 1:
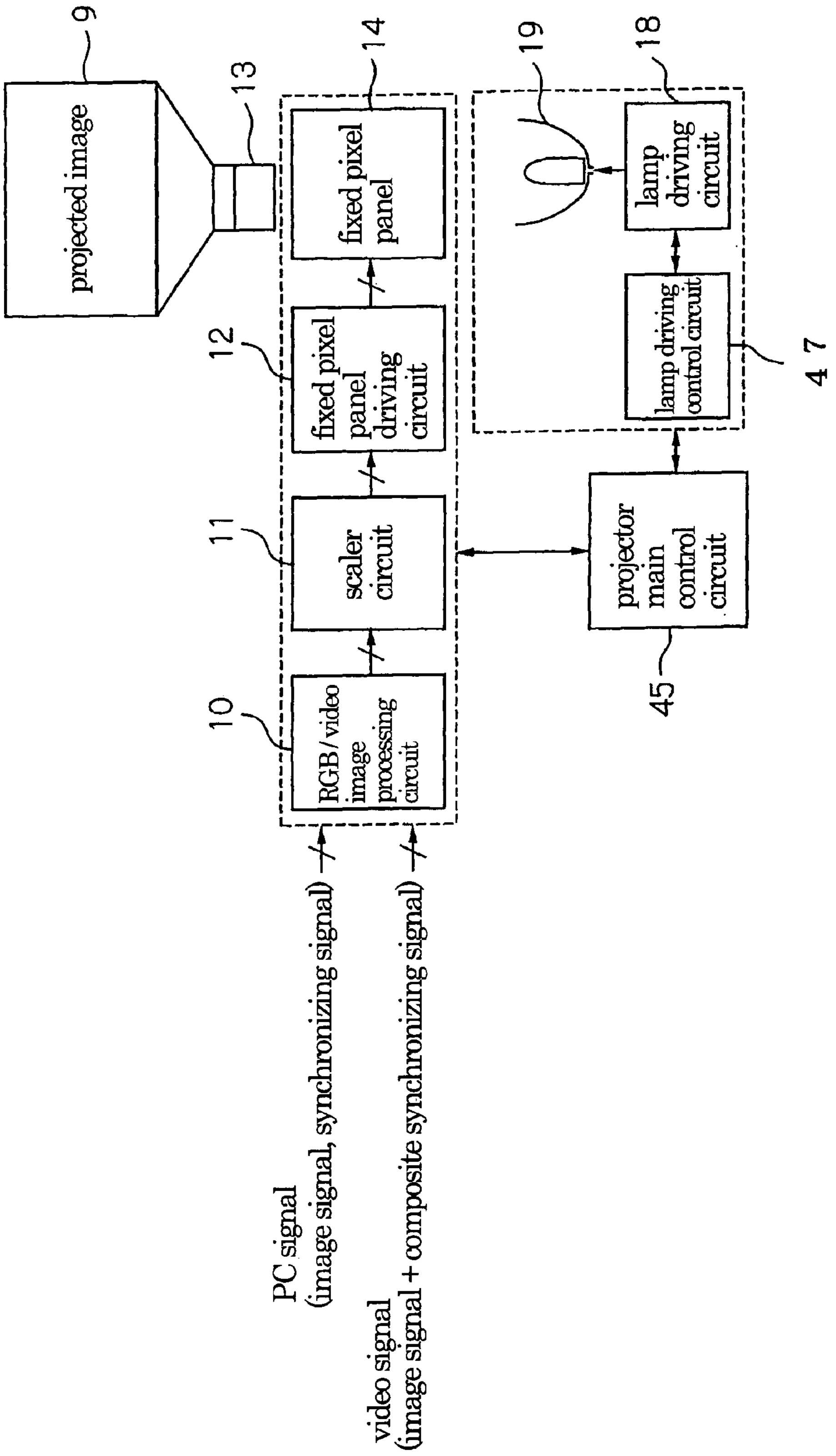
Fig. 1 PRIOR ART
FIG. 1 is a block diagram illustrating the configuration of a conventional projector.
Figure 2:
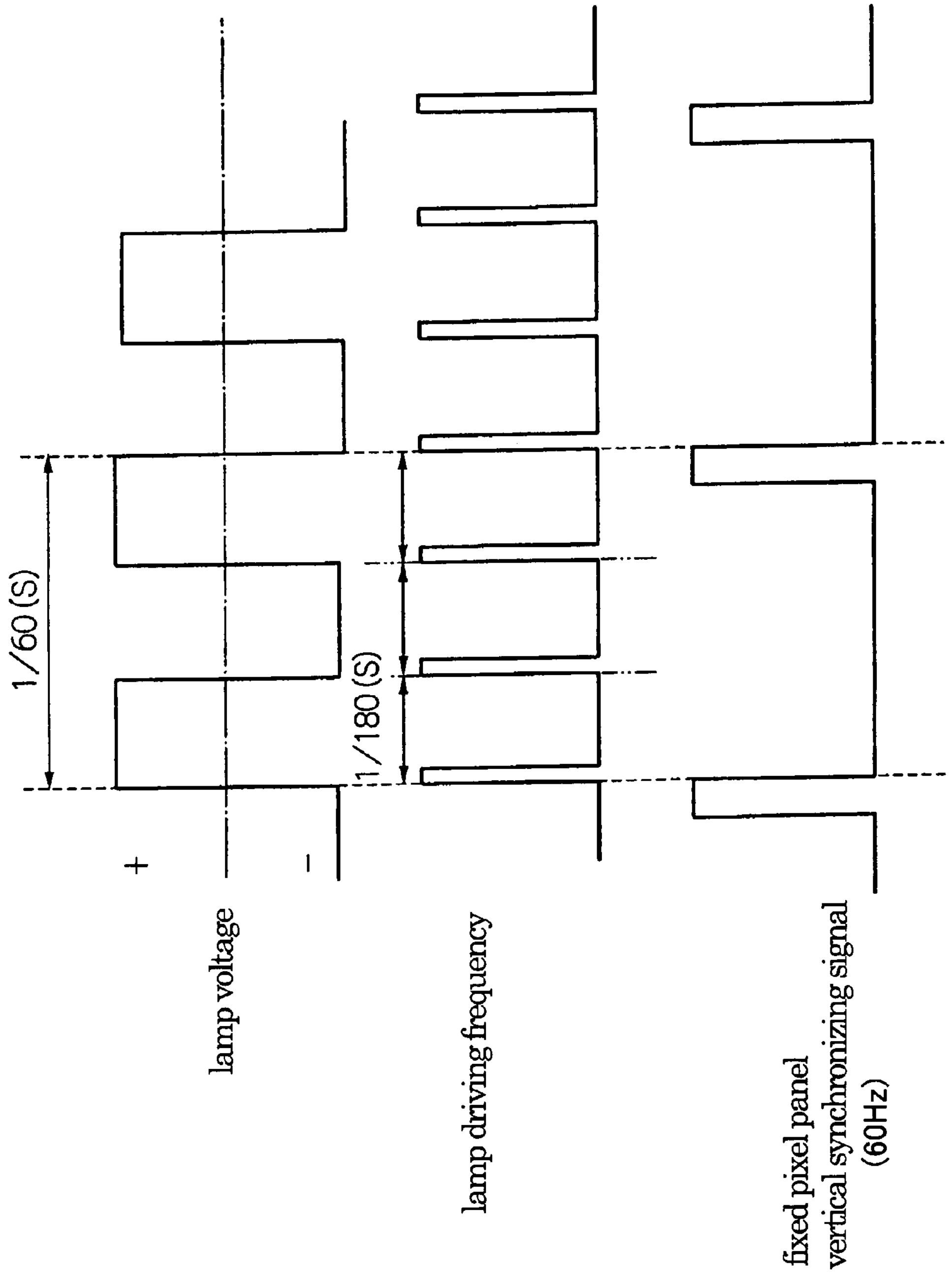
Fig. 2 PRIOR ART
FIG. 2 is a timing chart showing a lamp driving timing for the conventional projector illustrated in FIG. 1.
Figure 3:
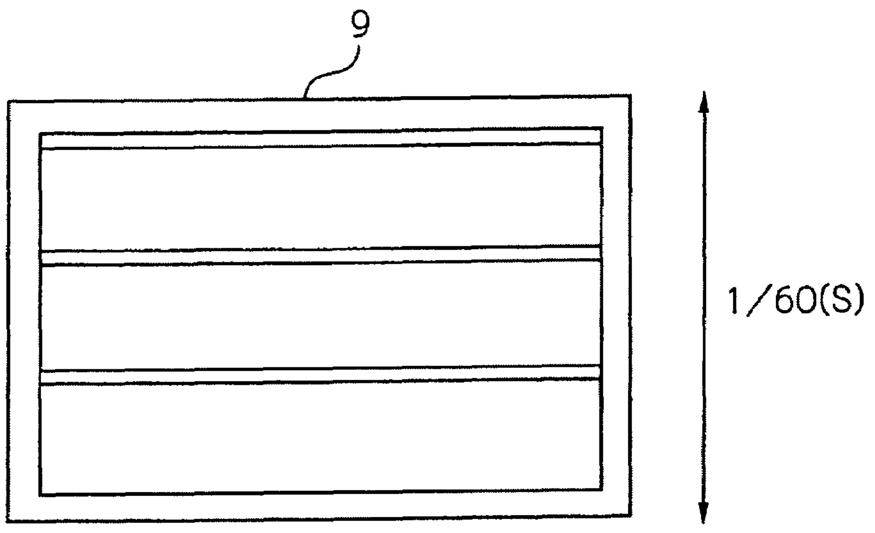
Fig. 3 PRIOR ART
FIG. 3 is a diagram for describing unscrolling flicker.

The projector of this embodiment differs from the conventional projector illustrated in FIG. 1 in that projector main control circuit 45 and lamp driving control circuit 47 are replaced with projector main control circuit 15 and lamp driving control circuit 17, respectively, and lamp load detecting circuit 16 is additionally included.

Lamp load detecting circuit 16 detects a loading condition of ultra-high pressure mercury lamp 19. Projector main control circuit 15 controls the overall projector, like projector main control circuit 45 in the conventional projector illustrated in FIG. 1. However, projector main control circuit 15 in this embodiment does not notify lamp driving control circuit 17 of the driving frequency for fixed pixel panel 14.

Thus, this embodiment is characterized in that lamp driving control circuit 17 drives ultra-high pressure mercury lamp 19 at a frequency which is not in synchronization with the vertical synchronizing frequency of an applied video signal and which is not a constant frequency.

The projector of this embodiment illustrated in FIG. 4 is provided with lamp load detecting circuit 16 which detects a loading condition of ultra-high pressure mercury lamp 19, whereas lamp driving control circuit 17 drives ultra-high pressure mercury lamp 19 with and without reference to the detected loading condition of ultra-high pressure mercury lamp 19. The following description will be given of the operation of lamp driving control circuit 17 in the respective cases.

First, a description will be given of the operation of lamp driving control circuit 17 when it drives ultra-high pressure mercury lamp 19 through lamp driving circuit 18 without reference to a loading condition of ultra-high pressure mercury lamp 19 detected by lamp load detecting circuit 16.

In this mode, lamp driving control circuit 17 does not drive ultra-high pressure mercury lamp 19 at a constant frequency, but varies the driving frequency within an allowable frequency range.

For example, when the allowable frequency range for ultra-high pressure mercury lamp 19 is from 140 to 260 Hz, lamp driving control circuit 17 randomly selects a frequency within the allowable frequency range to randomly switch the driving frequency of ultra-high pressure mercury lamp 19, such as to 260 Hz, 180 Hz, 250 Hz, 247 Hz, 233 Hz, 199 Hz, 253 Hz, . . . without regularity.

By thus changing the driving frequency for lighting ultra-high pressure mercury lamp 19 without regularity, flicker occurs at randomly varying locations on projected image 9, and is therefore not perceived by human's eyes as flicker due to the human's visual characteristics.

Also, lamp driving control circuit 17 changes the driving frequency by modulating the driving frequency for ultra-high pressure mercury lamp 19 such that the frequency becomes lower with respect to the highest frequency within the allowable frequency range, for example, by performing −2% modulation.

Here, the −2% modulation means that the driving frequency is switched to 100%, 98%, 100%, 98%, . . . . Specifically, when the highest frequency is 260 Hz within the allowable frequency range defined for the driving frequency for ultra-high pressure mercury lamp 19, 98% of the highest frequency is 254 Hz (=260 Hz x 0.98), so that the ultra-high pressure mercury lamp 19 is lit at a driving frequency which is switched to 260 Hz, 254 Hz, 260 Hz, 254 Hz, . . . .

Figure 5:
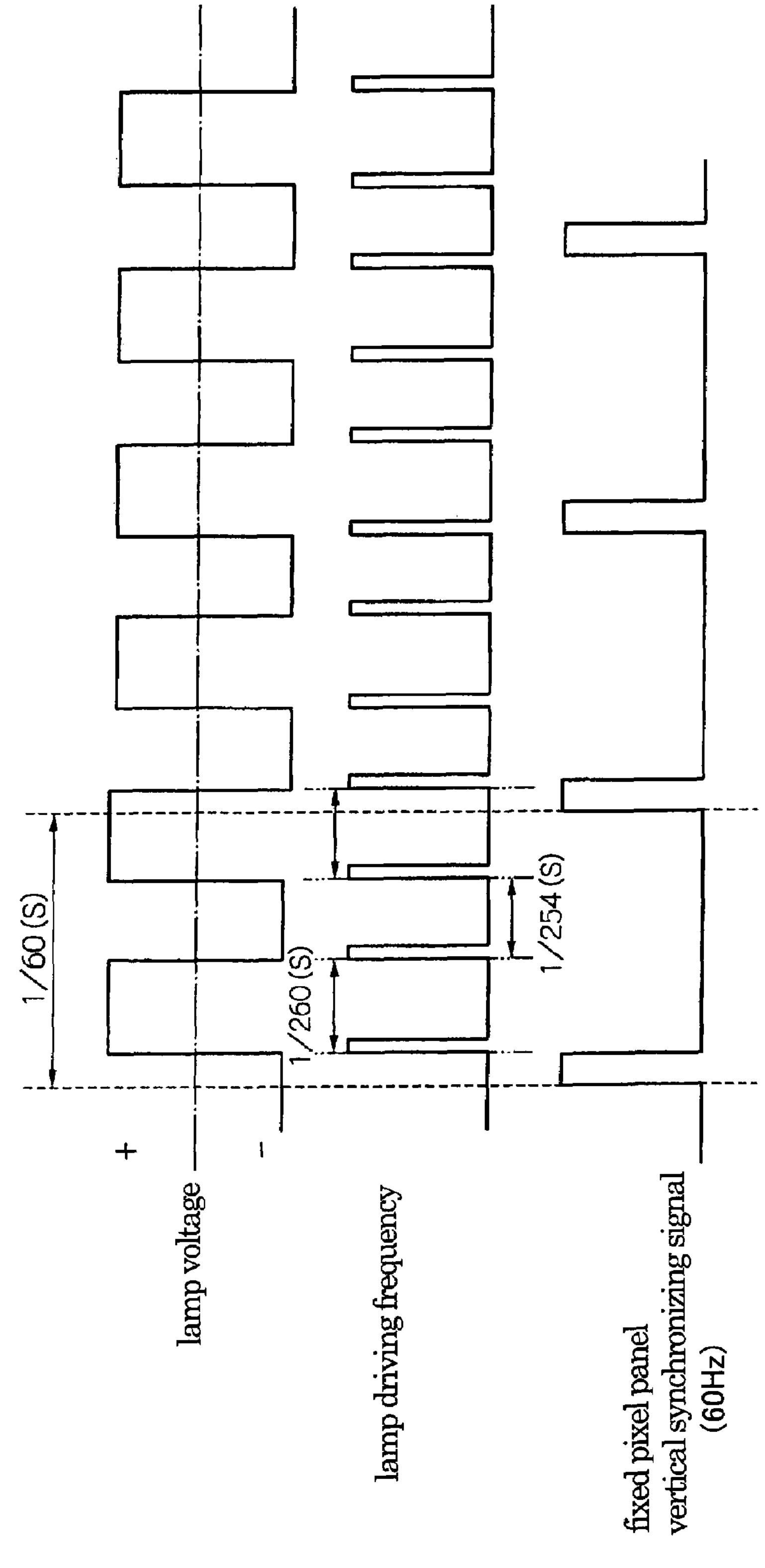
FIG. 5 is a timing chart showing vertical synchronization and lamp driving timing for fixed pixel panel 14 in the projector of one embodiment of the present invention, illustrated in FIG. 4.

FIG. 5 shows a driving timing when the light source lamp is driven with the −2% modulation which is applied to the highest frequency within the allowable frequency range for the driving frequency.

Since the driving frequency for lighting ultra-high pressure mercury lamp 19 is controlled to alternately switch between the highest driving frequency and the frequency 2% lower than the highest frequency, flicker is not perceived by human's eyes due to the human's visual characteristics, as is the case of randomly switching the driving frequency. The percentage applied to the modulation may be set in any manner as long as a resulting frequency falls under the allowable frequency range for the driving frequency. Also, while the foregoing description has been made for the driving frequency which is switched between two frequencies, the driving frequency may be switched among three or more frequencies.

Next, a description will be given of the operation of lamp driving control circuit 17 which drives ultra-high pressure mercury lamp 19 through lamp driving circuit 18 with reference to a loading condition of ultra-high pressure mercury lamp 19 detected by lamp load detecting circuit 16.

In this mode, lamp driving control circuit 17 monitors ultra-high pressure mercury lamp 19 for a loading condition detected by lamp load detecting circuit 16, selects a driving frequency at which ultra-high pressure mercury lamp 19 can be placed in an optimal condition, and modulates the selected driving frequency to change the driving frequency.

Specifically, lamp driving control circuit 17 monitors ultra-high pressure mercury lamp 19 for a loading condition which includes a lamp load voltage, lamp flicker, unusual noise or the like, and selects a driving frequency at which ultra-high pressure mercury lamp 19 can be placed in an optimal condition. Then, lamp driving control circuit 17 applies, for example, the −2% modulation to the selected driving frequency to change the driving frequency.

For example, when the allowable frequency range is from 140 to 260 Hz, where an optimal loading condition can be accomplished for ultra-high pressure mercury lamp 19 at 180 Hz, lamp driving control circuit 17 lights ultra-high pressure mercury lamp 19 while switching the driving frequency to 180 Hz, 176 Hz, 180 Hz, 176 Hz, . . . . Further, when the optimal driving frequency shifts while lamp driving control circuit 17 is monitoring ultra-high pressure mercury lamp 19 for the loading condition, lamp driving control circuit 17 changes the driving frequency for ultra-high pressure lamp 19 in response to the shift.

As described above, in the foregoing embodiment, the driving frequency is set to a frequency close to an optimal driving frequency for ultra-high pressure mercury lamp 19, thus making it possible to extend the lifetime of ultra-high pressure mercury lamp 19 and improve the reliability.

Further, in the projector of this embodiment, since the driving frequency for ultra-high pressure mercury lamp 19 is set independently of the frequency of the vertical synchronizing signal in an applied video signal, even an instable input video signal would not cause the lamp driving control to be instable, and the driving circuit can be prevented from producing unusual noise.

While the foregoing embodiment has been described in connection with an ultra-high pressure mercury lamp which is used as a light source lamp, the present invention is not limited to this particular light source lamp, but can be applied as well when another illuminating means is used for the light source lamp.

While a preferred embodiment of the present invention has been described using specific terms, such description is for illustrative purposes only, and it is to be understood that changes and variations may be made without departing from the spirit or scope of the following claims.

What is claimed is:

1. A projector for driving a fixed pixel panel based on an applied video signal, and transmitting or reflecting illumination light from a light source lamp by said fixed pixel panel to project an image, said projector comprising:

an AC-driven light source lamp;

a lamp driving circuit for driving said light source lamp; and a lamp driving control circuit for controlling said light source lamp for driving through said lamp driving circuit by changing a driving frequency for driving said light source lamp.

2. The projector according to claim 1, wherein said lamp driving control circuit changes the driving frequency for driving said light source lamp within an allowable frequency range.

3. The projector according to claim 1, wherein said lamp driving control circuit changes the driving frequency for driving said light source lamp without reference to the applied video signal.

4. The projector according to claim 2, wherein said lamp driving control circuit randomly selects a frequency within the allowable frequency range to change the driving frequency.

5. The projector according to claim 2, wherein said lamp driving control circuit changes the driving frequency by modulating a highest frequency within the allowable frequency range to reduce the frequency.

6. The projector according to claim 1, further comprising a lamp load detecting circuit for detecting a loading condition of said light source lamp, wherein said lamp driving control circuit monitors said light source lamp for a loading condition detected by said lamp load detecting circuit to select a driving frequency at which said light source lamp is placed in an optimal condition, and modulates the selected driving frequency to change the driving frequency.

7. The projector according to claim 1, wherein said lamp driving control circuit driving frequency is selected as predetermined to prolong a lifetime of said lamp.

8. A lamp driving control circuit for a projector driving a fixed pixel panel based on an applied video signal, and transmitting or reflecting illumination light from a light source lamp by said fixed pixel panel to project an image, said control circuit comprising:

a mechanism that changes a driving frequency while driving said light source lamp.

9. The lamp driving control circuit according to claim 8, wherein said driving frequency is changed within an allowable frequency range.

10. The lamp driving control circuit according to claim 8, wherein said driving frequency is changed without reference to the applied video signal.

11. The lamp driving control circuit according to claim 9, wherein said driving frequency is randomly selected within the allowable frequency range.

12. The lamp driving control circuit according to claim 9, wherein said driving frequency is changed by modulating a highest frequency within the allowable frequency range to reduce the frequency.

13. The lamp driving control circuit according to claim 8, further comprising an input for receiving a lamp load detecting circuit signal that detects a loading condition of said light source lamp and said lamp driving control circuit monitors said light source lamp for a loading condition detected by said lamp load detecting circuit to select a driving frequency at which said light source lamp is placed in an optimal condition and modulates the selected driving frequency to change the driving frequency.

14. A method of driving a light source lamp in a projector that drives a fixed pixel panel based on an applied video signal and transmits or reflects illumination light from said light source lamp to project an image, said method comprising:

changing a driving frequency while driving said light source lamp.

15. The method according to claim 14, wherein said driving frequency is changed within an allowable frequency range.

16. The method according to claim 14, wherein said driving frequency is changed without reference to the applied-video signal.

17. The method according to claim 15, wherein said driving frequency is randomly selected within the allowable frequency range.

18. The method according to claim 15, wherein said driving frequency is changed by modulating a highest frequency within the allowable frequency range to reduce the frequency.

19. The method according to claim 14, further comprising:

detecting a loading condition of said light source lamp;

monitoring said light source lamp for a loading condition;

selecting a driving frequency at which said light source lamp is placed in an optimal condition; and modulating the selected driving frequency to change the driving frequency.

20. The method of claim 14, wherein said driving frequency is changed in view of optimizing a lifetime of said light source lamp.

* * * * *